Patented Sept. 17, 1940

2,214,943

UNITED STATES PATENT OFFICE 2,214,943

PURIFICATION OF CELLULOSE ESTERS

John S. Tinsley, Highland Park, N. J., assignor to Hercules Powder Company, Wilmington, Del., a corporation of Delaware No Drawing. Application February 4, 1938, Serial No. 188,704

7 Claims. (Cl. 260—230)

This invention relates to the treatment of cellulose esters, and more particularly cellulose acetate, to remove fibers, dirt and other foreign impurities which almost invariably are found in such esters when produced commercially by the usual methods.

Cellulose esters are normally prepared by the treatment of cellulose with an organic acid anhydride in the presence of a solvent for the cellulose ester and an esterification catalyst. The cellulose so treated may, if desired, be subjected to a pretreatment such as, for example, with concentrated acetic acid, to render it more reactive with the organic acid anhydride. After the esterification proper, the reaction mixture may be subjected to hydrolysis treatment to change the characteristics of the cellulose ester. After the esterification reaction and the hydrolysis, if such is included, is completed, the cellulose ester is precipitated by the addition of an excess of a nonsolvent for the cellulose ester to the hydrolysis mixture. The product of this treatment normally contains fibers either of unesterified cellulose or of partially esterified cellulose which are insoluble in organic solvents. The product also normally contains dirt, metallic salts and other impurities which have been introduced with the raw materials or picked up in the process itself.

In the production of cellulose esters for use in the manufacture of photographic films, X-ray films, laminated plastics for use in safety glass and other uses where transparency and high clarity are necessary or desirable, it has been the practice to dissolve the solid cellulose ester in a solvent and subject the solution so formed to clarification treatment such as, for example, filtration. After filtration, or other clarification treatment, the cellulose ester is recovered from its solution in solid form by precipitation to render it suitable for commercial distribution.

The precipitation and re-solution of cellulose esters prior to filtration, rather than filtration of the reaction mixture prior to precipitation, has been used in spite of its greater cost, for the reason that filtration of the hydrolysis mixture has heretofore been found impractical, due to the presence of a large amount of inorganic, water-soluble salt resulting from the neutralization of the inorganic acidic catalyst present. A relatively large part of such inorganic salt readily crystallizes from the cellulose ester solution and has a tendency to clog the filter or other clarification apparatus used, making the removal of relatively small quantities of other solid materials from the solution almost impossible.

Now, in accordance with this invention, I provide a method which avoids the necessity for precipitating and redissolving a cellulose ester prior to subjecting it to a clarification treatment and, likewise, obviates the difficulties heretofore experienced in attempting to filter the reaction mixture prior to precipitation.

By the method in accordance with this invention, I add an amount of water, either in the form of water or as dilute acetic acid, to the solution of the cellulose ester remaining at the end of the reaction by which it is produced, which is sufficient to redissolve or to hold in solution the water-soluble inorganic salts resulting from the neutralization of the catalyst, but which is insufficient to cause a precipitation of the cellulose ester. After the addition of such an amount of water to the reaction mixture, I subject the solution to a clarification treatment which may take the form, for example, of filtration or centrifuging, either with or without the addition of a clarification aid such as, for example, asbestos fiber, cellulose fiber, diatomaceous earth, etc. In the clarification treatment I may filter the solution through any suitable filter material such as, for example, cotton wadding, cotton fabric, an absorbent silica mat, carbonaceous materials, etc. For the clarification of the solution by centrifuging, I have found that the various commercially available ultra-centrifuges are suitable.

The amount of water added to the hydrolysis mixture will depend upon a number of variable factors including the concentration of hydrolyzed cellulose esters in the solution, the amount of water which has already been added in carrying out the hydrolysis step, if such a step has been carried out, the temperature of operation, the amount of inorganic salts present, and the extent to which the inorganic salts have crystallized out of the solution or the readiness with which they crystallize on standing.

Thus, in a process for the manufacture of cellulose acetate, for example, I hydrolyze a solution containing 14% by weight of cellulose acetate dissolved in concentrated acetic acid. I add to this solution sufficient water to neutralize the acetic anhydride and give 8% excess water. After this hydrolysis treatment is completed the amount of additional water necessary to prevent the formation of sodium sulfate crystals varies with the temperature, the amount of sulfuric acid which has been used as a catalyst and the time available for crystal formation. Under the above conditions, I have found that it is necessary to add at least an additional amount of water equivalent to 16.5%, by weight, of the total hydrolysis mixture. I may, however, add as much as 50%, by weight, of water before precipitation of the cellulose ester takes place. The amount of water added under these conditions of operation may then be within the range of about 16.5% to about 50%, by weight, I have found that the optimum quantity of water to add is about 20% by weight of the total hydrolysis mixture under these conditions of operation.

The method in accordance with this invention is further illustrated by the following example:

*Example I*

One hundred parts by weight of purified cellulose, preheated with concentrated acetic acid, was acetylated at a temperature within the range of about 20 to about 40° C. with a mixture of 500 parts by weight of acetic acid, 300 parts by weight of acetic anhydride and 10-20 parts by weight of sulfuric acid. When the acetylation was complete the cellulose acetate was hydrolyzed by adding 100 parts water to the reaction mixture to give an acetic acid concentration of 85-95% by weight in the reaction mixture. The temperature was controlled at 20-55° C. until the desired acetate content was reached, at which time the reaction was stopped by adding sodium acetate to the reaction mixture to neutralize the sulfuric acid. The sodium sulfate formed by the reaction of sodium acetate with sulfuric acid precipitates in the reaction mixture. Two hundred parts by weight of water were then added to the hydrolysis mixture to redissolve the precipitated sodium sulfate. The solution was then filtered through cotton filter pads to remove the dirt and fibrous material contained therein. Then the cellulose acetate contained in the filtered solution was precipitated by the addition, to the reaction mixture, of an excess of acetic acid having a concentration of about 8% by weight.

In the above example, the 200 parts by weight, or 20% by weight of water added to the reaction mixture to keep the sodium sulfate in solution was a convenient amount, and I believe the optimum amount, to accomplish the desired result. It will, however, be fully appreciated that the amount of water added could have varied within the range of about 15% to about 40%, by weight, of the reaction mixture, under the conditions illustrated by this example.

The details and examples included hereinbefore are given by way of illustration of specific procedure in accordance with my invention, and not by way of limitation of the invention as broadly described and claimed. Thus, it will be appreciated that the range of amounts of water which may be added to the reaction mixture to keep the inorganic salt in solution will depend upon a number of reaction variables as hereinbefore set forth.

What I claim and desire to protect by Letters Patent is:

1. A process for the preparation of cellulose acetate which comprises acetylating cellulose with acetic anhydride and an inorganic acidic esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, neutralizing acidic catalyst to form a water-soluble inorganic salt which is incompletely soluble in the hydrolysis mixture, adding an amount of water sufficient to bring about complete solution of said inorganic salt but insufficient to precipitate the dissolved cellulose acetate, treating the cellulose acetate solution so obtained to remove undissolved solids suspended in the solution, and precipitating the dissolved cellulose acetate from the said solution.

2. A process for the preparation of cellulose acetate which comprises acetylating cellulose with acetic anhydride and an inorganic acidic esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, adding an amount of water sufficient to prevent precipitation of water-soluble inorganic salt which normally tends to precipitate in the hydrolysis solution upon neutralization of acidic catalyst to said salt but insufficient to precipitate the dissolved cellulose acetate, neutralizing acidic catalyst to form a water-soluble inorganic salt, treating the cellulose acetate solution so obtained to remove undissolved solids suspended in the solution, and precipitating the dissolved cellulose acetate from the said solution.

3. A process for the preparation of cellulose acetate which comprises acetylating cellulose with acetic anhydride and sulphuric acid as an esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, neutralizing sulphuric acid catalyst to form an alkali metal sulphate insoluble at least in part in the hydrolysis reaction solution, adding an amount of water sufficient to bring about complete solution of the said sulphate but insufficient to precipitate the dissolved cellulose acetate, treating the cellulose acetate solution so obtained to remove undissolved solids suspended in the solution, and precipitating the dissolved cellulose acetate from the said solution.

4. A process for the preparation of cellulose acetate which comprises acetylating cellulose with acetic anhydride and sulphuric acid as an esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, adding an amount of water sufficient to prevent precipitation of alkali metal sulphate which normally tends to precipitate in the hydrolysis solution when said sulphate is formed upon neutralization of the sulphuric acid catalyst but insufficient to precipitate the dissolved cellulose acetate, neutralizing sulphuric acid catalyst to form an alkali metal sulphate, treating the cellulose acetate solution so obtained to remove undissolved solids suspended in the solution, and precipitating the dissolved cellulose acetate from the said solution.

5. A process for the preparation of cellulose acetate which comprises acetylating cellulose with acetic anhydride and sulphuric acid as an esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, neutralizing sulphuric acid catalyst with sodium acetate to form sodium sulphate precipitating at least in part in the hydrolysis reaction mixture, adding an amount of water sufficient to bring about complete solution of the sodium sulphate but insufficient to precipitate the dissolved cellulose acetate, treating the cellulose acetate solution so obtained to remove undissolved solids suspended in the solution, and precipitating the dissolved cellulose acetate from the said solution.

6. A process for the preparation of cellulose acetate which comprises acetylating cellulose with acetic anhydride and sulphuric acid as an esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, adding an amount of water sufficient to prevent precipitation of sodium sulphate which normally tends to precipitate in the hydrolysis solution upon neutralization of sulphuric acid catalyst to sodium sulphate but insufficient to precipitate the dissolved cellulose acetate, neutralizing sulphuric acid catalyst with sodium acetate to form sodium sulphate, treating the cellulose acetate solution so obtained to remove undissolved solids suspended in the solution, and precipitating the dissolved cellulose acetate from the said solution.

7. A process for the preparation of cellulose acetate which comprises acetylating cellulose with acetic anhydride and an inorganic acidic esterification catalyst in a solvent for the cellulose acetate to form a cellulose acetate solution, adding water to the cellulose acetate solution in excess of that required to convert remaining acetic anhydride to acetic acid, hydrolyzing the cellulose acetate until the desired acetate content is reached, applying to the solution of cellulose acetate a combination of the step of neutralizing acidic catalyst to form a water-soluble inorganic salt normally incompletely soluble in the hydrolysis mixture and the step of adding an amount of water sufficient to insure complete solution of the said salt but insufficient to precipitate the dissolved cellulose acetate, whereby there is produced by the said combination a solution of hydrolyzed cellulose acetate with said salt completely in solution, treating the cellulose acetate solution so obtained to remove undissolved solids suspended in the solution, and precipitating the dissolved cellulose acetate from the said solution.

JOHN S. TINSLEY.